(12) United States Patent
Zhao

(10) Patent No.: US 12,394,225 B1
(45) Date of Patent: Aug. 19, 2025

(54) AUTOMATIC RECOGNITION METHOD AND SYSTEM OF PATHOLOGY IMAGE BASED ON DEEP LEARNING

(71) Applicant: Zhenfeng Zhao, Jiangsu (CN)

(72) Inventor: Zhenfeng Zhao, Jiangsu (CN)

( * ) Notice: Subject to any disclaimer, the term of this patent is extended or adjusted under 35 U.S.C. 154(b) by 0 days.

(21) Appl. No.: 19/217,080

(22) Filed: May 23, 2025

(30) Foreign Application Priority Data

Oct. 10, 2024 (CN) .......................... 202411405035.3

(51) Int. Cl.
*G06K 9/00* (2022.01)
*G06V 10/26* (2022.01)
*G06V 10/30* (2022.01)
*G06V 10/36* (2022.01)
*G06V 10/40* (2022.01)
*G06V 10/764* (2022.01)
*G06V 10/774* (2022.01)
(Continued)

(52) U.S. Cl.
CPC ............ *G06V 20/698* (2022.01); *G06V 10/26* (2022.01); *G06V 10/30* (2022.01); *G06V 10/36* (2022.01); *G06V 10/40* (2022.01); *G06V 10/764* (2022.01); *G06V 10/774* (2022.01); *G06V 10/82* (2022.01); *G06V 20/695* (2022.01); *G06V 2201/03* (2022.01)

(58) Field of Classification Search
None
See application file for complete search history.

(56) References Cited

U.S. PATENT DOCUMENTS

| 2016/0266126 | A1* | 9/2016 | Shipitsin ................... G06T 7/11 |
| 2020/0342597 | A1 | 10/2020 | Chukka et al. |
| 2022/0083762 | A1 | 3/2022 | Chen et al. |

FOREIGN PATENT DOCUMENTS

| CN | 111134735 A | 5/2020 |
| CN | 112750106 A | 5/2021 |
| CN | 116912823 A | 10/2023 |

OTHER PUBLICATIONS

CNIPA, First Office Action issued for Chinese Application No. 202411405035.3, mailed Nov. 15, 2024 (11 pages).

(Continued)

*Primary Examiner* — SJ Park
(74) *Attorney, Agent, or Firm* — HOWARD M COHN and Associates, LLC

(57) ABSTRACT

An automatic recognition method includes the following steps: collecting multiple digital pathology slide images as sample data, segmenting collected sample image data, where segmented cell images includes a positive cell image and a negative cell image, and the positive cell image and the negative cell image obtained by segmentation are stored into a positive cell image set and a negative cell image set correspondingly; preprocessing images in the two image sets to facilitate subsequent recognition and extraction of a single cell picture in the image; acquiring the extracted single cell picture, extracting a feature of a single cell image to be recognized, and training an initial neural network with a corresponding cell feature as a label; and generating a comprehensive evaluation coefficient according to the cell feature corresponding to the image cell in each region, and determining a detailed cell type according to the comprehensive evaluation coefficient.

2 Claims, 2 Drawing Sheets

(51) Int. Cl.
*G06V 10/82* (2022.01)
*G06V 20/69* (2022.01)

(56) References Cited

OTHER PUBLICATIONS

Notification to Grant Patent Right for Invention, Chinese Application No. 202411405035.3, mailed Dec. 10, 2024 (3 pages).

\* cited by examiner

AUTOMATIC RECOGNITION METHOD AND SYSTEM OF PATHOLOGY IMAGE BASED ON DEEP LEARNING

CROSS-REFERENCE TO RELATED APPLICATION

The application claims priority of Chinese patent application CN202411405035.3, filed on Oct. 10, 2024, which is incorporated herein by reference in its entireties.

TECHNICAL FIELD

The present disclosure relates to the technical field of automatic recognition of histopathology images, and in particular to an automatic recognition method and system of a pathology image base on deep learning.

BACKGROUND

During diagnosis and prognosis of tumors, pathological diagnosis is one of the most commonly used methods, and the diagnosis result directly determines the formulation of a treatment plan. During pathological diagnosis, doctors need to observe pathology slides under a microscope, which has a large workload and a certain degree of subjectivity, making the diagnosis results prone to subjective differences.

Digital pathological diagnosis is the application of information technology in the field of pathology, which is the organic combination of a computer system and a traditional optical microscope device. Although the digital pathological diagnosis technology improves the diagnosis efficiency by changing the storage and reading form of the pathological slides, the diagnosis results are still affected by subjective factors. More importantly, when reading digital slides, pathologists still need to continuously observe different regions of the same slide in a fixed field of view, which takes a lot of time to complete the diagnosis.

With the development of artificial neural networks, the application of deep learning in the field of image processing is more and more extensive, and its effect in image recognition such as face has surpassed that of traditional pattern recognition and image processing algorithms. The application of the deep learning algorithm in medical images has broad prospects. Deep learning employs hierarchical neural networks to extract features, and subjective factors introduced by artificial feature extraction are avoided. A back propagation algorithm is configured to update network coefficients, so that the training results can automatically converge to the optimal solution. By mining information from huge input data, the generalization ability of the network is enhanced.

In the prior art, in patent No. CN114118258A, a pathology slide feature fusion method based on a background-directed attention mechanism is provided. The method includes extracting features of pathology image slides by using a pre-trained deep neural network, and converting the features into d-dimensional features by using linear transform; randomly generating a d-dimensional initial background vector according to a d-dimensional normal distribution; starting from the generated initial background vector, obtaining a background vector of the pathology image through a cycle module; calculating an attention weight of each slide feature by using the obtained background vector; weighing and summing the attention weights of the features to obtain a fused pathology image feature. This method improves the accuracy of the fused feature, and effectively improves the quality of the fused pathology image feature, making the accuracy in a subsequent classification task significantly improved. However, the initial background vector is randomly generated according to the d-dimensional normal distribution. This method may lead to greater uncertainty of an initial value of the background vector, thereby affecting the stability and consistency of the whole model and leading to the decrease of the accuracy and effectiveness of the model in identifying tasks.

The above information disclosed in the background section is only for enhancing understanding of the background of the present disclosure, so that it may include the information that does not constitute the prior art that is known to those of ordinary skill in the art.

SUMMARY

An objective of the present disclosure is to provide a method and system for automatically identifying a pathology image base on deep learning, thereby solving the problems in the background.

To achieve the objective above, the present disclosure employs the following technical solution:

An automatic recognition method of a pathology image based on deep learning includes specific steps as follows:

collecting multiple digital pathology slide images as sample data, where the digital pathology slide image is an immunohistochemical-stained digital slide image;

performing image segmentation on the collected immunohistochemical-stained digital slide image to segment the immunohistochemical-stained digital slide image into a positive cell image, a negative cell image, and a background image, generating a positive cell image set and a negative cell image set, and storing the positive cell image and the negative cell image obtained after segmentation into the positive cell image set and the negative cell image set correspondingly;

preprocessing cell images in the positive cell image set and the negative cell image set, where preprocessing includes image denoising processing and enhancement processing;

constructing a cell extraction module based on a YOLOv5s network, inputting the preprocessed cell image into the cell extraction model to generate multiple single cell pictures of different general cell types, where the general cell types include an individual cell, and a bicellular adhesive cell cluster;

taking an extracted signal cell picture as a sample, extracting features of the single cell picture, where the features include a perimeter, an area, a shape factor and a color of the cell, labeling the extracted features on the single cell picture as labels, and training the initial neural network with the single cell picture labeled with the labels to acquire a cell feature extraction model;

segmenting and preprocessing an immunohistochemical-stained digital slide image to be recognized according to an above method, and inputting the segmented and preprocessed image into the cell extraction model to obtain a single cell image to be recognized, inputting the single cell image to be recognized into the trained cell feature extraction model to acquire cell features corresponding to the single cell image to be recognized; and generating a comprehensive evaluation coefficient according to the cell feature corresponding to single cell image to be recognized, comparing the generated comprehensive evaluation coefficient with a preset cell type threshold, and determining a detailed cell type according to different comparison results, where the detailed cell type includes an individual positive cell, a bicellular adhesive positive cell cluster, an individual negative cell and a bicellular adhesive negative cell cluster.

Further, multiple digital pathology slide images are collected, where the digital pathology slide image is an immunohistochemical-stained digital slide image, the immunohistochemical-stained digital slide image uses a proliferating cell nuclear antigen (PCNA) as a marker, tumor cells in different cell cycles are stained by immunohistochemistry, and 3,3'-diaminobenzidine is used as a substrate, so that all PCNA positive nuclei appear brown staining, while negative nuclei are not stained.

Further, a method for performing image segmentation on the collected immunohistochemical-stained digital slide image is a two-dimensional maximum entropy threshold segmentation method based on two color models, and a two-dimensional entropy of an image is based on a formula as follows:

$$H = -\sum_i \sum_j p_{i,j} lg p_{i,j}$$

where H is a two-dimensional entropy of an image, $P_{i,j}$ indicates a probability that a point with a gray value of i and a neighborhood gray mean of j appears in the image; a threshold vector is set as (k, q), where k indicates a local gray value, q indicates a domain mean of a pixel; for an image with L gray levels, probabilities of defining a region 1 and a region 2 by the threshold (k, q) are marked as $p_1$ and $p_2$, where the region 1 and the region 2 are a target cell region and a background region, respectively, and $p_1$ and $p_2$ are based on formulas as follows:

$$p_1 = \sum_{i=0}^{k-1} \sum_{j=0}^{q-1} p_{i,j}$$

$$p_2 = \sum_{i=k}^{L-1} \sum_{j=q}^{L-1} p_{i,j}$$

a discriminant function of the two-dimensional entropy is based on a formula as follows:

$$\varphi(s,t) = \max(H_1 + H_2)$$

where $\varphi(s, t)$ is a discriminant function of the two-dimensional entropy, $H_1$ and $H_2$ represent two-dimensional entropies of the region 1 and the region 2, respectively, and $H_1$ and $H_2$ are based on formulas as follows:

$$H_1 = -\sum_{i=0}^{k-1} \sum_{j=0}^{q-1} \frac{p_{i,j}}{p_1} lg \frac{p_{i,j}}{p_1}$$

$$H_2 = -\sum_{i=k}^{L-1} \sum_{j=q}^{L-1} \frac{p_{i,j}}{p_1} lg \frac{p_{i,j}}{p_2}$$

where L is a gray level of the image.

Further, the target cell region obtained by the two-dimensional maximum entropy threshold segmentation method is divided into a positive cell image and a negative cell image by a RGB model, and the positive cell image and the negative cell image obtained after segmentation are stored in a positive cell image set and a negative cell image set correspondingly.

Further, preprocessing cell images in the positive cell image set and the negative cell image set is based on a logic as follows:

denoising the cell image by a wavelet transform denoising method, where the wavelet transform denoising method specifically includes the following steps: decomposing the cell image by wavelet transform to obtain wavelet coefficients of the image in different scales and directions; performing threshold processing on the wavelet coefficient, setting a wavelet coefficient with a low amplitude to zero, while retaining a wavelet coefficient with a high amplitude; performing inverse transform on the wavelet coefficient after threshold processing, reconstructing the processed coefficients into an image to complete denoising processing of the cell image.

Detail enhancement is performed on the cell image by bilateral filtering, where a specific formula for filtering transform is as follows:

$$B_y = \frac{\sum_y I_y G_d G_r}{\sum_y G_d G_r}$$

where y is a coordinate vector in an image coordinate space, $I_y$ is a gray value at a coordinate vector y, $B_y$ is a gray value obtained by performing bilateral filtering transformation on the gray value $I_y$, $G_d$ and $G_r$ are Gaussian functions, where $G_d$ and $G_r$ are based on formulas as follows:

$$G_d = \exp\left(-\frac{\|x-y\|_2^2}{2\sigma_d^2}\right)$$

$$G_r = \exp\left(-\frac{\|I_x - I_y\|^2}{2\sigma_r^2}\right)$$

where x is a coordinate vector in an image coordinate space, $I_x$ is a gray value at a coordinate vector x, and $\sigma_d$ and $\sigma_r$ are standard deviations of $G_d$ and $G_r$, respectively.

Further, a cell extraction module is constructed based on a YOLOv5s network, the preprocessed cell image is input into the cell extraction model to generate multiple single cell pictures of different general cell types, where generating multiple single cell pictures of different general cell types is based on a logic as follows:

collecting multiple publicly available cell images as a sample set, where the publicly available cell image includes an individual cell and a bicellular adhesive cell cluster, labeling an edge region of each of the individual cell and the bicellular adhesive cell cluster in the publicly available cell image by a manual labeling mode, and inputting the labeled edge region into the YOLOv5s network for training to obtain a cell extraction model, where an input of the cell extraction model is the cell image, an output of the cell extraction model is single cell pictures of different general cell types, the general cell types include an individual cell and a bicellular adhesive cell cluster; inputting the preprocessed cell image into the cell extraction model to generate a plurality of single cell pictures of different general cell types.

Further, features of the single cell image to be recognized are extracted, where the features include a perimeter, an area, a shape factor and a color of the cell, and calculating the shape factor is based on a formula as follows:

$$SF = \frac{4\pi * \text{Area}}{\text{perimeter}^2}$$

where SF is a shape factor of a cell, Area indicates an area of the cell, and perimeter is a perimeter of the cell.

A logic for assigning the color of cell is as follows: assigning a value of 1 to positive nuclei stained with brown, while assigning a value of 0 to negative nuclei which remain unstained; training the initial neural network to acquire the cell feature extraction model, where the cell feature extraction module is established based on a convolutional neural network.

Further, generating a comprehensive evaluation coefficient according to the cell feature corresponding to the single cell image to be recognized is based on a logic as follows:

$$\text{score} = \omega_1 * \text{Area} + \omega_2 * \text{perimeter} + \omega_3 * \frac{1}{SF}$$

where score is a comprehensive evaluation coefficient, $\omega_1$, $\omega_2$ and $\omega_3$ are weight coefficients of an area of the cell, a perimeter of the cell and a shape factor of the cell, and $\omega_1$, $\omega_2$ and $\omega_3$ are all greater than 0 and $\omega_1 \leq \omega_2 \leq \omega 3$;

comparing the generated comprehensive evaluation coefficient with a preset cell type threshold and determining a detailed cell type according to different comparison results are based on a logic as follows: assigning a value of YS to a color of a calibrated cell, and assigning a value of YZ to the preset cell type threshold;

when 0<score≤YZ*0.4 and YS>0, determining that the cell is an individual positive cell;

when 0<score≤YZ*0.4 and YS=0, determining that the cell is an individual negative cell;

when YZ*0.4<score≤YZ*1.0 and YS>0, determining that the cell is a bicellular adhesive positive cell cluster; and when YZ*0.4<score≤YZ*1.0 and YS=0, determining that the cell is a bicellular adhesive negative cell cluster.

The present disclosure further provides a system for automatically identifying a pathology image based on deep learning, where the system for automatically identifying a pathology image based on deep learning is configured to execute the automatic recognition method of a pathology image based on deep learning described above, and includes:

a sample data collection module, configured to collect a plurality of digital pathology slide images, where the digital pathology slide image is an immunohistochemical-stained digital slide image;

an image segmentation module, configured to perform image segmentation on the collected immunohistochemical-stained digital slide image to segment the immunohistochemical-stained digital slide image into a positive cell image, a negative cell image, and a background image, generate a positive cell image set and a negative cell image set, and store the positive cell image and the negative cell image obtained after segmentation into the positive cell image set and the negative cell image set correspondingly;

an image preprocessing module, configured to preprocess cell images in the positive cell image set and the negative cell image set, where preprocessing includes image denoising and enhancement processing;

a target extraction module, configured to construct a cell extraction module based on YOLOv5s network, input the preprocessed cell image into the cell extraction model to generate a plurality of single cell pictures of different general cell types, where the general cell types include an individual cell, and a bicellular adhesive cell cluster;

a training module of a feature extraction model, configured to take an extracted signal cell picture as a sample and extract features of the single cell picture, where the features include a perimeter, an area, a shape factor and a color of the cell, label the extracted features on the single cell picture as labels, and train the initial neural network with the single cell picture labeled with the labels to acquire a cell feature extraction model;

a feature extraction module, configured to segment and preprocess an immunohistochemical-stained digital slide image to be recognized according to a method above, and input the segmented and preprocessed image into the cell extraction model to obtain a single cell image to be recognized, input the single cell image to be recognized into the trained cell feature extraction model to acquire a cell feature corresponding to the single cell image to be recognized; and a pathological cell recognition module, configured to generate a comprehensive evaluation coefficient according to the cell feature corresponding to the single cell image to be recognized, compare the generated comprehensive evaluation coefficient with a preset cell type threshold, determine a detailed cell type according to different comparison results, where the detailed cell type includes an individual positive cell, a bicellular adhesive positive cell cluster, an individual negative cell and a bicellular adhesive negative cell cluster.

Compared with the prior art, the present disclosure has beneficial effects as follows:

Multiple digital pathology slide images are collected as sample data, a two-dimensional maximum entropy threshold segmentation method is used for the collected sample image data, a cell image in the cell sample image is separated from a background image, the cell image obtained by segmentation is divided into a positive cell image and a negative cell image through a RGB model, a positive cell image set and a negative cell image set are generated, and the positive cell image and the negative cell image obtained by segmentation are stored in the positive cell image set and the negative cell image set correspondingly. Images in the positive cell image set and the negative cell image set are preprocessed to enhance an edge of a single cell while making the quality of an image higher. A cell extraction model is constructed based on YOLOv5s network, the preprocessed cell image is input into the cell extraction model to generated multiple single cell pictures of different general cell types, where the general cell types include an individual cell and a bicellular adhesive cluster. The extracted single cell picture is used as a sample, features of a regional cell image to be recognized is extracted, and corresponding cell features are used as labels to train the initial neural network. The image to be recognized is segmented, a target, after being preprocessed and extracted, is used as an input of the trained neural network to acquire the cell feature corresponding to the single cell image to be recognized. A comprehensive evaluation coefficient is generated according to the cell feature corresponding to the single cell image to be recognized, and a detailed cell type is determined according to the comprehensive evaluation coefficient. According to this method, firstly, the image data is segmented and preprocessed to enhance quality of the image, so that the accuracy of identifying the model is improved. Then, a convolutional neural network is configured to extract different types of cell features, and the comprehensive evaluation coefficient is generated from the corresponding cell feature. The cell type is determined according to the comprehensive evaluation coefficient, which improves the recognition stability and effectiveness of the system.

DETAILED DESCRIPTION OF THE EMBODIMENTS

To make the objectives, technical solutions and advantages of the present disclosure more clearly, the present disclosure is further described in detail below in conjunction with specific embodiments.

Unless otherwise defined, it should be noted that technical terms or scientific terms used herein shall have their ordinary meanings as understood by those of ordinary skill in the art to which the present disclosure belongs. The words "first", "second" and the like used in the present disclosure do not indicate any order, quantity or importance, but are only used to distinguish different components. As used herein, similar words such as "including" or "containing" mean that the elements or objects appearing before the word cover the elements or objects listed after the word and their equivalents, but other elements or objects are not excluded. Similar words such as "connected" or "connection" are not limited to physical or mechanical connection, but may include electrical connection, whether direct or indirect. "Up", "down", "left" and "right" are only used to express the relative positional relationship. When an absolute position of a described object changes, the relative positional relationship may also change accordingly.

Embodiment

Figure 1:
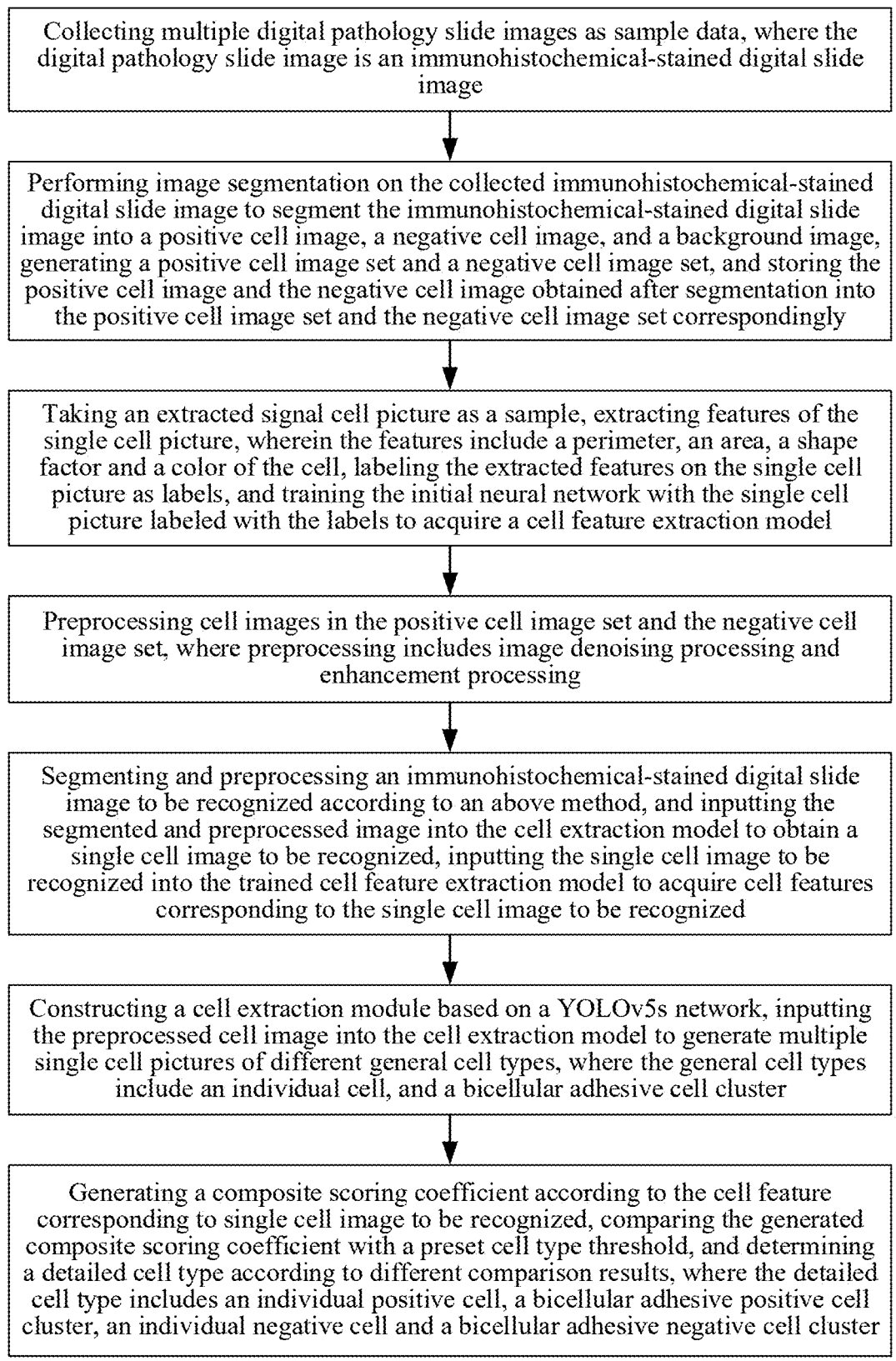
FIG. 1 is a flow diagram of an overall method according to the present disclosure.

Please referring to FIG. 1, the present disclosure provides a technical solution:

An automatic recognition method of a pathology image based on deep learning includes specific steps as follows:

Step 1. multiple digital pathology slide images are collected as sample data, where the digital pathology slide image is an immunohistochemical-stained digital slide image;

multiple digital pathology slide images are collected, where the digital pathology slide image is an immunohistochemical-stained digital slide image, the immunohistochemical-stained digital slide image uses a proliferating cell nuclear antigen (PCNA) as a marker, tumor cells in different cell cycles are stained by immunohistochemistry, and 3,3'-diaminobenzidine is used as a substrate, so that all PCNA positive nuclei appear brown staining, while negative nuclei are not stained.

The proliferating cell nuclear antigen (PCNA) can be configured to distinguish tumor cells with strong proliferative ability from cells in G0 phase, this is because the proliferating cells have PNCA expressions in G1, S, G2 and M phases of the cell cycle, while the cells in G0 phase have little or no PCNA expression, the cells in G1, S, G2 and M phases of the cycle are positive cells, and the cells in the G0 phase are negative cells.

Step 2. image segmentation is performed on the collected immunohistochemical-stained digital slide image to segment the immunohistochemical-stained digital slide image into a positive cell image, a negative cell image, and a background image, a positive cell image set and a negative cell image set are generated, and the positive cell image and the negative cell image obtained after segmentation are stored into the positive cell image set and the negative cell image set correspondingly;

a method for performing image segmentation on the collected immunohistochemical-stained digital slide image is a two-dimensional maximum entropy threshold segmentation method based on two color models, and a two-dimensional entropy of an image is based on a formula as follows:

$$H = -\sum_i \sum_j p_{i,j} lg p_{i,j}$$

where H is a two-dimensional entropy of an image, $P_{i,j}$ indicates a probability that a point with a gray value of i and a neighborhood gray mean of j appears in the image; a threshold vector is set as (k, q), where k indicates a local gray value, q indicates a domain mean of a pixel; for an image with L gray levels, probabilities of defining a region 1 and a region 2 by the threshold (k, q) are marked as $p_1$ and $p_2$, where the region 1 and the region 2 are a target cell region and a background region, respectively, and $p_1$ and $p_2$ are based on formulas as follows:

$$p_1 = \sum_{i=0}^{k-1} \sum_{j=0}^{q-1} p_{i,j}$$
$$p_2 = \sum_{i=k}^{L-1} \sum_{j=q}^{L-1} p_{i,j}$$

a discriminant function of the two-dimensional entropy is based on a formula as follows:

$$\varphi(s,t) = \max(H_1 + H_2)$$

where $\varphi(s, t)$ is a discriminant function of the two-dimensional entropy, $H_1$ and $H_2$ represent two-dimensional entropies of the region 1 and the region 2, respectively, and $H_1$ and $H_2$ are based on formulas as follows:

$$H_1 = -\sum_{i=0}^{k-1} \sum_{j=0}^{q-1} \frac{p_{i,j}}{p_1} lg \frac{p_{i,j}}{p_1}$$
$$H_2 = -\sum_{i=k}^{L-1} \sum_{j=q}^{L-1} \frac{p_{i,j}}{p_2} lg \frac{p_{i,j}}{p_2}$$

where L is a gray level of the image.

The two-dimensional maximum entropy threshold method generates a two-dimensional gray histogram by using a gray value of a pixel and a neighboring gray mean, where the abscissa is a local gray level, the ordinate is the neighboring gray mean, and a region away from a diagonal is noise. An optimal two-dimensional threshold vector (k, q) is acquired by traversing a gray distribution space to distinguish a target from a background, and an entropy discriminant function is maximized by selecting an optimal two-dimensional threshold vector (k, q), which can ensure a difference between the positive cell and the negative cell and between the cell and the background while segmenting. The two-dimensional maximum entropy threshold effectively solves the influence of a signal-to-noise ratio and a target-background ratio on a segmentation algorithm, and is suitable for complex and diverse pathological pictures; and the target cell region obtained by the two-dimensional maximum entropy threshold segmentation method is divided into a positive cell image and a negative cell image by a RGB model, and the positive cell image and the negative cell image obtained by segmentation are stored in the positive cell image set and the negative cell image set correspondingly. The RGB model is the most commonly used color model. In an optical scanning system, the color is represented by linear combination of three components, and the pathology image is analyzed by the RGB model from the perspective of natural color composition, which can accurately distinguish positive cells from negative cells.

Step 3. Cell images in the positive cell image set and the negative cell image set are preprocessed, where preprocessing includes image denoising and enhancement processing, and is based on a logic as follows:

a wavelet transform denoising method is used to denoise a medical laboratory sheet image;

the cell image is denoised by the wavelet transform denoising method, where the wavelet transform denoising method specifically includes the following steps: converting a table region of the medical laboratory sheet into a gray image, normalizing the image to make the gray value range from 0 to 1; selecting an appropriate wavelet basis function to determine a wavelet function (e.g., Daubechies wavelet db4); selecting the number of layers of wavelet decomposition, which is generally 3-5 layers; performing threshold processing on the wavelet coefficient, selecting a threshold method, where the threshold method includes a hard threshold or a soft threshold, and calculating the threshold; performing inverse wavelet transform by using the wavelet coefficient after threshold processing, and reconstructing a denoised image, where VisuShrink method is used for calculating the threshold, with a specific calculation formula as follows:

$$lam = sig * \sqrt[2]{2 * \log p}$$

where lam is a threshold, sig is a standard deviation of noise, and p is a total number of pixels in the image;

detail enhancement is performed on the cell image by bilateral filtering, where a specific formula for filtering transform is as follows:

$$B_y = \frac{\sum_y I_y G_d G_r}{\sum_y G_d G_r}$$

where y is a coordinate vector in an image coordinate space, $I_y$ is a gray value at a coordinate vector y, $B_y$ is a gray value obtained by performing bilateral filtering transformation on the gray value $I_y$, $G_d$ and $G_r$ are Gaussian functions, where $G_d$ and $G_r$ are based on formulas as follows:

$$G_d = \exp\left(-\frac{\|x - y\|_2^2}{2\sigma_d^2}\right)$$

$$G_r = \exp\left(-\frac{\|I_x - I_y\|^2}{2\sigma_r^2}\right)$$

where x is a coordinate vector in an image coordinate space, $I_x$ is a gray value at a coordinate vector x, $\sigma_d$ and $\sigma_r$ and or are standard deviations of $G_d$ and $G_r$, respectively.

Ga measures the spatial relationship between x and y, which makes closer pixels have a greater impact on a gray value at x; $G_r$ is the range relationship between x and y, which makes the points with similar gray values in the neighborhood have larger weights at computing; $G_d$ and $G_r$ are both Gaussian functions with standard deviations are Ga and or respectively. In a flat region, the gray value changes little in each direction, the range weight $G_r$ is close to 1 in the neighborhood. In this case, only the position relationship affects the filtering result, and $B_y$ is equivalent to Gaussian filtering, which has a good suppression effect on noise. At the edge of the cell, the gray value changes sharply in a normal direction of a boundary, which leads to a sudden decline of the range weight. Only the pixels in a near neighborhood in a tangent direction of the boundary have an influence on a center point, thereby strengthening edge information of the cell.

Step 4. A target extraction module is constructed based on YOLOv5s, the preprocessed cell image is input into the cell extraction model to generate multiple single cell pictures of different general cell types, where the general cell types comprise an individual cell, and a bicellular adhesive cell cluster;

the cell extraction module is constructed based on a YOLOv5s network, the preprocessed cell image is input into the cell extraction model to generate multiple single cell pictures of different general cell types, where generating multiple single cell pictures of different general cell types is based on a logic as follows:

collecting multiple publicly available cell images as a sample set, where the publicly available cell image includes an individual cell and a bicellular adhesive cell cluster, labeling an edge region of each of the individual cell and the bicellular adhesive cell cluster in the publicly available cell image by a manual labeling mode, and inputting the labeled edge region into the YOLOv5s network for training to obtain a cell extraction model, wherein an input of the cell extraction model is the cell image, an output of the cell extraction model is single cell pictures of different general cell types, the general cell types comprise an individual cell and a bicellular adhesive cell cluster; inputting the preprocessed cell image into the cell extraction model to generate a plurality of single cell pictures of different general cell types.

The YOLOv5s network is mainly used for real-time target detection. Target detection is an important task in the field of computer vision, with an objective of detecting different categories of objects from an image or a video and marking their positions accurately. YOLOv5s is a model of YOLO (You Only Look Once) series, which can achieve balance between the real-time performance and accuracy.

All the cell targets in the image are labeled after a cell target is extracted, a data set in a VOC format is made with LabelImg tool, and then the data set in the VOC format is converted into a data set in yolo format suitable for YOLOv5s network, including an individual cell and a bicellular adhesive cell cluster;

the labeled cell target image is clip, with a clipping method as follows: clipping based on a minimum bounding rectangle, where specific steps are as follows: labeling a boundary box of a single cell by using a detection algorithm YOLOv5s network and a LabelImg tool; acquiring coordinates of the minimum bounding rectangle of the labeled cell target, including coordinates of a boundary point in an upper left corner of the minimum bounding rectangle and coordinates of a boundary point in a lower right corner; clipping different types of cell images containing a complete single cell according to the coordinates of the minimum bounding rectangle of the obtained cell target.

Step 5. An extracted signal cell picture is taken as a sample, features of the single cell picture are extracted, where the features include a perimeter, an area, a shape factor and a color of the cell, the extracted features are labeled on the single cell picture as labels, and the initial neural network is trained with the single cell picture labeled with the labels to acquire a cell feature extraction model.

The cell feature extraction model is composed of a convolutional neural network, the convolutional neural network includes an input layer, a convolutional layer, an activation function layer, a pooling layer, a fully connected layer, a normalization layer, and an output layer. The activation function layer selects ReLU function as an activation function.

Features of the single cell picture are extracted, where the features include a perimeter, an area, a shape factor and a color of the cell, where calculating the shape factor is based on a formula as follows:

$$SF = \frac{4\pi * \text{Area}}{\text{perimeter}^2}$$

where SF is a shape factor of a cell, Area indicates an area of the cell, and perimeter is a perimeter of the cell.

A logic for assigning the color of cell is as follows: assigning a value of 1 to positive nuclei stained with brown, while assigning a value of 0 to negative nuclei which remain unstained; training the initial neural network to acquire the cell feature extraction model, where the cell feature extraction module is established based on a convolutional neural network.

Step 6. The immunohistochemical stained digital slide image to be recognized are segmented and preprocessed, and then input into the cell extraction model to obtain a single cell image to be recognized, the single cell image to be recognized is input into the trained cell feature extraction model to acquire a cell feature corresponding to the single cell image to be recognized.

To facilitate the distinction, the processed image to be recognized in real time is called a single cell image to be recognized, and the image used for training is called a single cell picture.

Step 7. A comprehensive evaluation coefficient is generated according to the cell feature corresponding to single cell image to be recognized, the generated comprehensive evaluation coefficient is compared with a preset cell type threshold, a detailed cell type is determined according to different comparison results, where the detailed cell type includes an individual positive cell, a bicellular adhesive positive cell cluster, an individual negative cell and a bicellular adhesive negative cell cluster.

Further, generating a comprehensive evaluation coefficient according to the cell feature corresponding to the single cell image to be recognized is based on a logic as follows:

$$\text{score} = \omega_1 * \text{Area} + \omega_2 * \text{perimeter} + \omega_3 * \frac{1}{SF}$$

where score is a comprehensive evaluation coefficient, $\omega_1$, $\omega_2$ and $\omega_3$ are weight coefficients of an area of the cell, a perimeter of the cell and a shape factor of the cell, and $\omega_1$, $\omega_2$ and $\omega_3$ are all greater than 0 and $\omega_1 \leq \omega_2 < \omega_3$, where score is in direction proportion to the area of the cell and the perimeter of the cell, the greater the area of the cell, the higher the comprehensive evaluation coefficient, the greater the perimeter, the higher the comprehensive evaluation coefficient, the smaller an SF value of the shape factor of the cell, indicating that the shape is more complex and irregular, so the score is inversely proportional to the shape factor SF of the cell.

Comparing the generated comprehensive evaluation coefficient with a preset cell type threshold and determining a detailed cell type according to different comparison results are based on a logic as follows: assigning a value of YS to a color of a calibrated cell, and assigning a value of YZ to the preset cell type threshold;

when 0<score≤YZ*0.4 and YS>0, determining that the cell is an individual positive cell;

when 0<score≤YZ*0.4 and YS=0, determining that the cell is an individual negative cell;

when YZ*0.4<score≤YZ*1.0 and YS>0, determining that the cell is a bicellular adhesive positive cell cluster; and when YZ*0.4<score≤YZ*1.0 and YS=0, determining that the cell is a bicellular adhesive negative cell cluster.

Figure 2:
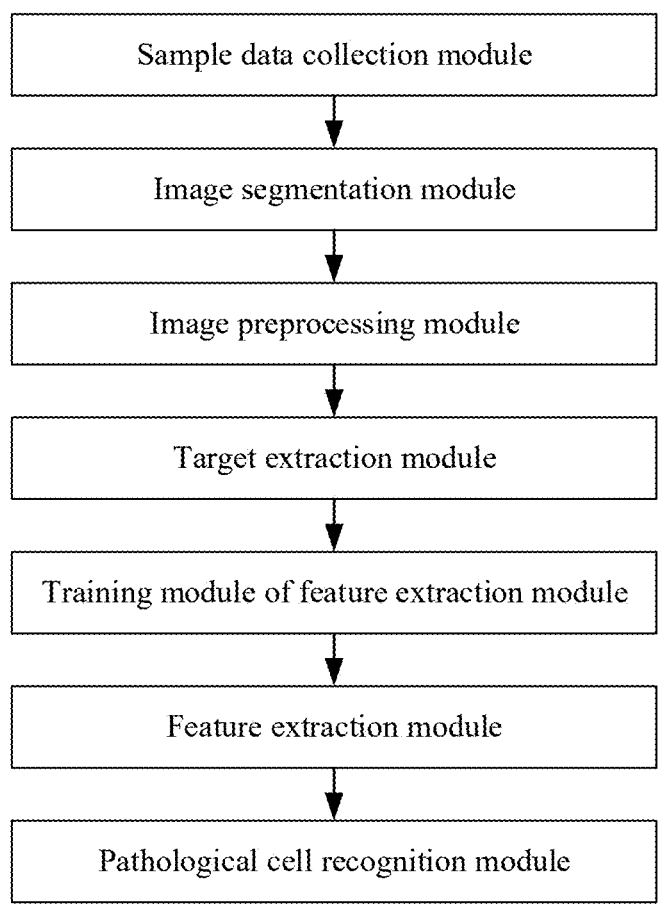
FIG. 2 is a structural diagram of an overall system according to the present disclosure.

Please referring to FIG. 2, the present disclosure further provides an automatic recognition system of a pathology image based on deep learning, where the automatic recognition system of a pathology image based on deep learning is configured to execute the automatic recognition method of a pathology image based on deep learning described above, and includes:

a sample data collection module, configured to collect a plurality of digital pathology slide images, where the digital pathology slide image is an immunohistochemical-stained digital slide image;

an image segmentation module, configured to perform image segmentation on the collected immunohistochemical-stained digital slide image to segment the immunohistochemical-stained digital slide image into a positive cell image, a negative cell image, and a background image, generate a positive cell image set and a negative cell image set, and store the positive cell image and the negative cell image obtained after segmentation into the positive cell image set and the negative cell image set correspondingly;

an image preprocessing module, configured to preprocess cell images in the positive cell image set and the negative cell image set, where preprocessing comprises image denoising and enhancement processing;

a target extraction module, configured to construct a cell extraction module based on YOLOv5s network, input the preprocessed cell image into the cell extraction model to generate a plurality of single cell pictures of different general cell types, wherein the general cell types comprise an individual cell, and a bicellular adhesive cell cluster;

a training module of a feature extraction model, configured to take an extracted signal cell picture as a sample and extract features of the single cell picture, wherein the features comprise a perimeter, an area, a shape factor and a color of the cell, label the extracted features on the single cell picture as labels, and train the initial neural network with the single cell picture labeled with the labels to acquire a cell feature extraction model;

a feature extraction module, configured to segment and preprocess an immunohistochemical-stained digital slide image to be identified according to a method above, and input the segmented and preprocessed image into the cell extraction model to obtain a single cell image to be identified, input the single cell image to be identified into the trained cell feature extraction model to acquire a cell feature corresponding to the single cell image to be identified; and a pathological cell identification module, configured to generate a comprehensive evaluation coefficient according to the cell feature corresponding to the single cell image to be identified, compare the generated comprehensive evaluation coefficient with a preset cell type threshold, determine a detailed cell type according to different comparison results, wherein the detailed cell type comprises an individual positive cell, a bicellular adhesive positive cell cluster, an individual negative cell and a bicellular adhesive negative cell cluster.

The above formulas are all calculated by removing dimensions and taking their numerical values. The formula is a formula closet to a real situation, which is obtained by collecting a lot of data for software simulation, and preset parameters in the formula are set by those skilled in the art according to the actual situation.

The above embodiments can be implemented in whole or in part by software, hardware, firmware or any other combination. When implemented by software, the embodiments can be implemented in whole or in part in the form of computer program products. Those skilled in the art can realize that the units and algorithm steps of examples described in connection with the embodiments disclosed herein can be implemented by electronic hardware, or a combination of computer software and electronic hardware. Whether these functions are implemented by hardware or software depends on the specific application and design constraints of the technical scheme.

The units described as separate components may or may not be physically separated, and the components shown as units may or may not be physical units, which may or may not be located in one place or distributed to multiple network units. A part or all of the units can be selected according to actual needs to implement the objective of this embodiment.

The above is only the specific embodiments of the present disclosure, but the scope of protection of the present disclosure is not limited thereto. Any change or substitution that can be easily thought of by any person skilled in the art within the technical scope disclosed in the present disclosure should be covered by the scope of protection of the present disclosure.

What is claimed is:

1. An automatic recognition method of a pathology image based on deep learning, comprising specific steps as follows:

collecting a plurality of digital pathology slide images as sample data, wherein the digital pathology slide image is an immunohistochemical-stained digital slide image, the immunohistochemical-stained digital slide image uses a proliferating cell nuclear antigen (PCNA) as a marker, tumor cells in different cell cycles are stained by immunohistochemistry, and 3,3'-diaminobenzidine is used as a substrate, thereby enabling all PCNA positive nuclei appear brown staining, while negative nuclei not be stained;

performing image segmentation on the collected immunohistochemical-stained digital slide image to segment the immunohistochemical-stained digital slide image into a positive cell image, a negative cell image, and a background image, generating a positive cell image set and a negative cell image set, and storing the positive cell image and the negative cell image obtained after segmentation into the positive cell image set and the negative cell image set correspondingly;

wherein a method for performing image segmentation on the collected immunohistochemical-stained digital slide image is a two-dimensional maximum entropy threshold segmentation method based on two color models, and a two-dimensional entropy of an image is based on a formula as follows:

$$H = -\sum_{i}\sum_{j} p_{i,j} lg p_{i,j}$$

wherein H is a two-dimensional entropy of an image, $P_{i,j}$ indicates a probability that a point with a gray value of i and a neighborhood gray mean of j appears in the image; setting a threshold vector as (k, q), wherein k indicates a local gray value, q indicates a domain mean of a pixel; for an image with L gray levels, marking probabilities of defining a region 1 and a region 2 by the threshold (k, q) as $p_1$ and $p_2$, wherein the region 1 and the region 2 are a target cell region and a background region, respectively, and $p_1$ and $p_2$ are based on formulas as follows:

$$p_1 = \sum_{i=0}^{k-1}\sum_{j=0}^{q-1} p_{i,j}$$

$$p_2 = \sum_{i=k}^{L-1}\sum_{j=q}^{L-1} p_{i,j}$$

a discriminant function of the two-dimensional entropy is based on a formula as follows:

$$\varphi(s,t) = \max(H_1 + H_2)$$

wherein φ(s, t) is a discriminant function of the two-dimensional entropy, $H_1$ and $H_2$ represent two-dimensional entropies of the region 1 and the region 2, respectively, and $H_1$ and $H_2$ are based on formulas as follows:

$$H_1 = -\sum_{i=0}^{k-1}\sum_{j=0}^{q-1} \frac{p_{i,j}}{p_1} lg \frac{p_{i,j}}{p_1}$$

$$H_2 = -\sum_{i=k}^{L-1}\sum_{j=q}^{L-1} \frac{p_{i,j}}{p_2} lg \frac{p_{i,j}}{p_2}$$

wherein L is a gray level of the image;

dividing the target cell region obtained by the two-dimensional maximum entropy threshold segmentation method into a positive cell image and a negative cell image by a RGB model, and storing the positive cell image and the negative cell image obtained after segmentation in a positive cell image set and a negative cell image set correspondingly;

preprocessing cell images in the positive cell image set and the negative cell image set, wherein preprocessing comprises image denoising processing and enhancement processing;

preprocessing cell images in the positive cell image set and the negative cell image set, wherein preprocessing is based on a logic as follows:

denoising the cell image by a wavelet transform denoising method, wherein the wavelet transform denoising method specifically comprises the following steps: decomposing the cell image by wavelet transform to obtain wavelet coefficients of the image in different scales and directions; performing threshold processing on the wavelet coefficient, setting a wavelet coefficient with a low amplitude to zero, while retaining a wavelet coefficient with a high amplitude; performing inverse transform on the wavelet coefficient after threshold processing, reconstructing the processed coefficients into an image to complete denoising processing of the cell image;

performing detail enhancement on the cell image by bilateral filtering, wherein a specific formula for filtering transform is as follows:

$$B_y = \frac{\sum_y I_y G_d G_r}{\sum_y G_d G_r}$$

wherein y is a coordinate vector in an image coordinate space, $I_y$ is a gray value at a coordinate vector y, $B_y$ is a gray value obtained by performing bilateral filtering transformation on the gray value $I_y$, $G_d$ and $G_r$ are Gaussian functions, wherein $G_d$ and $G_r$ are based on formulas as follows:

$$G_d = \exp\left(-\frac{\|x-y\|_2^2}{2\sigma_d^2}\right)$$

$$G_r = \exp\left(-\frac{\|I_x-I_y\|^2}{2\sigma_r^2}\right)$$

wherein x is a coordinate vector in an image coordinate space, $I_x$ is a gray value at a coordinate vector x, and $\sigma_d$ and $\sigma_r$ are standard deviations of $G_d$ and $G_r$, respectively;

constructing a cell extraction module based on a YOLOv5s network, inputting the preprocessed cell image into the cell extraction model to generate a plurality of single cell pictures of different general cell types, wherein the general cell types comprise an individual cell, and a bicellular adhesive cell cluster;

constructing a cell extraction module based on YOLOv5s network, inputting the preprocessed cell image into the cell extraction model based to generate a plurality of single cell pictures of different general cell types, wherein the plurality of single cell pictures of different general cell types are generated based on a logic as follows:

collecting a plurality of publicly available cell images as a sample set, wherein the publicly available cell image comprises an individual cell and a bicellular adhesive cell cluster, labeling an edge region of each of the individual cell and the bicellular adhesive cell cluster in the publicly available cell image by a manual labeling mode, and inputting the labeled edge region into the YOLOv5s network for training to obtain a cell extraction model, wherein an input of the cell extraction model is the cell image, an output of the cell extraction model is single cell pictures of different general cell types, the general cell types comprise an individual cell and a bicellular adhesive cell cluster; inputting the preprocessed cell image into the cell extraction model to generate a plurality of single cell pictures of different general cell types;

taking an extracted signal cell picture as a sample, extracting features of the single cell picture, wherein the features comprise a perimeter, an area, a shape factor and a color of the cell, labeling the extracted features on the single cell picture as labels, and training the initial neural network with the single cell picture labeled with the labels to acquire a cell feature extraction model;

segmenting and preprocessing an immunohistochemical-stained digital slide image to be recognized according to an above method, and inputting the segmented and preprocessed image into the cell extraction model to obtain a single cell image to be recognized, inputting the single cell image to be recognized into the trained cell feature extraction model to acquire cell features corresponding to the single cell image to be recognized;

extracting features of the single cell picture, wherein the features comprise a perimeter, an area, a shape factor and a color of the cell, and calculating the shape factor is based on a formula as follows:

$$SF = \frac{4\pi^* \text{Area}}{\text{perimeter}^2}$$

wherein SF is a shape factor of a cell, Area indicates an area of the cell, and perimeter is a perimeter of the cell;

a logic for assigning the color of cell is as follows: assigning a value of 1 to positive nuclei stained with brown, while assigning a value of 0 to negative nuclei which remain unstained; training the initial neural network to acquire the cell feature extraction model, wherein the cell feature extraction module is established based on a convolutional neural network;

generating a comprehensive evaluation coefficient according to the cell feature corresponding to single cell image to be recognized, comparing the generated comprehensive evaluation coefficient with a preset cell type threshold, and determining a detailed cell type according to different comparison results, wherein the detailed cell type comprises an individual positive cell, a bicellular adhesive positive cell cluster, an individual negative cell and a bicellular adhesive negative cell cluster;

wherein generating a comprehensive evaluation coefficient according to the cell feature corresponding to the single cell image to be recognized is based on a logic as follows:

$$\text{score} = \omega_1 * \text{Area} + \omega_2 * \text{perimeter} + \omega_3 * \frac{1}{SF}$$

wherein score is a comprehensive evaluation coefficient, $\omega_1$, $\omega_2$ and $\omega_3$ are weight coefficients of an area of the cell, a perimeter of the cell and a shape factor of the cell, and $\omega_1$, $\omega_2$ and $\omega_3$ are all greater than 0 and $\omega_1 \leq \omega_2 < \omega_3$;

comparing the generated comprehensive evaluation coefficient with a preset cell type threshold and determining a detailed cell type according to different comparison results are based on a logic as follows: assigning a value of YS to a color of a calibrated cell, and assigning a value of YZ to the preset cell type threshold;

when 0<score≤YZ*0.4 and YS>0, determining that the cell is an individual positive cell;

when 0<score≤YZ*0.4 and YS=0, determining that the cell is an individual negative cell;

when YZ*0.4<score≤YZ*1.0 and YS>0, determining that the cell is a bicellular adhesive positive cell cluster; and when YZ*0.4<score≤YZ*1.0 and YS=0, determining that the cell is a bicellular adhesive negative cell cluster.

2. An automatic recognition system of a pathology image based on deep learning, wherein the system for automatically identifying a pathology image based on deep learning is configured to execute the automatic recognition method of a pathology image based on deep learning according to claim 1, and comprises:

a sample data collection module, configured to collect a plurality of digital pathology slide images, wherein the digital pathology slide image is an immunohistochemical-stained digital slide image;

an image segmentation module, configured to perform image segmentation on the collected immunohistochemical-stained digital slide image to segment the immunohistochemical-stained digital slide image into a positive cell image, a negative cell image, and a background image, generate a positive cell image set and a negative cell image set, and store the positive cell image and the negative cell image obtained after segmentation into the positive cell image set and the negative cell image set correspondingly;

an image preprocessing module, configured to preprocess cell images in the positive cell image set and the negative cell image set, wherein preprocessing comprises image denoising and enhancement processing;

a target extraction module, configured to construct a cell extraction module based on YOLOv5s network, input the preprocessed cell image into the cell extraction model to generate a plurality of single cell pictures of different general cell types, wherein the general cell types comprise an individual cell, and a bicellular adhesive cell cluster;

a training module of a feature extraction model, configured to take an extracted signal cell picture as a sample and extract features of the single cell picture, wherein the features comprise a perimeter, an area, a shape factor and a color of the cell, label the extracted features on the single cell picture as labels, and train the initial neural network with the single cell picture labeled with the labels to acquire a cell feature extraction model;

a feature extraction module, configured to segment and preprocess an immunohistochemical-stained digital slide image to be recognized according to a method above, and input the segmented and preprocessed image into the cell extraction model to obtain a single cell image to be recognized, input the single cell image to be recognized into the trained cell feature extraction model to acquire a cell feature corresponding to the single cell image to be recognized; and a pathological cell recognition module, configured to generate a comprehensive evaluation coefficient according to the cell feature corresponding to the single cell image to be recognized, compare the generated comprehensive evaluation coefficient with a preset cell type threshold, determine a detailed cell type according to different comparison results, wherein the detailed cell type comprises an individual positive cell, a bicellular adhesive positive cell cluster, an individual negative cell and a bicellular adhesive negative cell cluster.

* * * * *